(12) United States Patent
Yang et al.

(10) Patent No.: US 8,737,278 B1
(45) Date of Patent: May 27, 2014

(54) FULL DUPLEX WIRE-LINE TRANSCEIVER WITH ECHO CANCELLATION LINE DRIVER

(75) Inventors: Frank Yang, Sunnyvale, CA (US); Tarun Gupta, Santa Clara, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 365 days.

(21) Appl. No.: 13/298,580

(22) Filed: Nov. 17, 2011

(51) Int. Cl.
*H04B 3/20* (2006.01)
*H04B 3/23* (2006.01)

(52) U.S. Cl.
CPC ........................................ *H04B 3/23* (2013.01)
USPC ........................................................... 370/286

(58) Field of Classification Search
CPC .................................................... H04L 5/1461
See application file for complete search history.

(56) References Cited

U.S. PATENT DOCUMENTS

| | | | |
|---|---|---|---|
| 7,009,945 B1* | 3/2006 | Tang et al. | 370/286 |
| 7,738,408 B2* | 6/2010 | Chiu et al. | 370/276 |
| 8,295,214 B2* | 10/2012 | Chandra et al. | 370/286 |
| 2002/0085510 A1* | 7/2002 | Chan | 370/286 |
| 2005/0135283 A1* | 6/2005 | Chan | 370/286 |
| 2009/0017770 A1* | 1/2009 | Mirzaei et al. | 455/73 |
| 2011/0310936 A1* | 12/2011 | Malkin et al. | 375/219 |

OTHER PUBLICATIONS

S. Gupta, J. Tellado, S. Begur, et al., "A 10Gb/s IEEE 802.3an Compliant Ethernet Transceiver for 100m UTP Cable in 0.13μm CMOS," ISSCC Dig. Tech. Papers, pp. 106-107, Feb. 2.
G. Chandra, M. Malkin, "A Full-Duplex 10GBase-T Transmitter Hybrid with SFDR >65dBc Over 1 to 400MHz in 40nm CMOS," ISSCC Dig. Tech. Papers, pp. 144-145, Feb. 2011.

* cited by examiner

*Primary Examiner* — Chirag Shah
*Assistant Examiner* — Amar Persaud
(74) *Attorney, Agent, or Firm* — Amin, Turocy & Watson, LLP

(57) ABSTRACT

A full-duplex wire-line transceiver is provided with echo cancellation line driver. The transceiver has an impedance matching network with a network interface, and a transmit interface to accept a differential transmit signal for transmission via the network. The impedance matching network has a receive interface to supply a differential receive signal accepted at the network interface, where the transmit interface is coupled to the receive interface. A hybrid circuit has an input to accept the differential receive signal combined with a coupled differential transmit signal, and input to accept a differential echo cancellation (EC) signal. The hybrid circuit has an output to supply the differential receive signal with the coupled differential transmit signal attenuated in response to the differential EC signal. A line driver uses an active current mirror to generate matched transmit and EC signals.

11 Claims, 5 Drawing Sheets

FULL DUPLEX WIRE-LINE TRANSCEIVER WITH ECHO CANCELLATION LINE DRIVER

BACKGROUND OF THE INVENTION

1. Field of the Invention

This invention generally relates to full duplex communications and, more particularly, to an improved system and method for full duplex wire-line transceiver echo cancellation.

2. Description of the Related Art

FIG. 1 is a schematic block diagram of an inverted line driver as used in a full duplex wire-line transceiver system (prior art). As noted in Wikipedia, a full-duplex (FDX), sometimes referred to as a double-duplex system, allows communication in both directions, and, unlike half-duplex, allows this to happen simultaneously. Land-line telephone networks are full-duplex, since they allow both callers to speak and be heard at the same time.

Full-duplex Ethernet connections work by making simultaneous use of two physical pairs of twisted cable, where one pair is used for receiving packets and one pair is used for sending packets (two pairs per direction for some types of Ethernet), to a directly connected device. The figure depicts the transmit (TX) pair. This effectively makes the cable itself a collision-free environment and doubles the maximum data capacity that can be supported by the connection.

Hybrid echo is generated by the public switched telephone network (PSTN) through the reflection of electrical energy by a device called a hybrid. The fundamental principle is that of impedance matching. The send signal is conventionally applied to both the telephone line and a 'balancing network' that is designed to have the same impedance as the line. The receive signal is derived by subtracting the two, thus canceling the send audio. Early hybrids were made with transformers configured as hybrid coils that had an extra winding that could be connected out of phase. The name 'hybrid' comes from these special mixed-winding transformers. An effective hybrid would have high trans-hybrid loss, which means that relatively little of the send audio would appear on the receive port.

Good echo cancellation (EC) depends upon the balancing network having a frequency-vs.-impedance characteristic that accurately matches the line. Since telephone line impedances vary depending upon many factors and the relationship is not always smooth, analog hybrids are able to achieve only a few dB of guaranteed isolation. For this reason, modern hybrids use digital signal processing (DSP) to implement an adaptive least mean squares filter that automatically detects the line's impedance across the voice frequency range and adjusts to it. These DSP systems typically use multiple digital-to-analog converters (DACs), which consume an undesirable large amount of power and may lead to current matching problems. The analog portions of these circuits typically use current mirrors to match output currents, which are not always linear over the full spectrum of operating frequencies. A current mirror is a circuit designed to copy a current through one active device by controlling the current in another active device of a circuit, keeping the output current constant regardless of loading. The current being 'copied' can be, and sometimes is, a varying signal current. A number of current mirror circuits are known in the art.

It would be advantageous if echo cancellation in a full-duplex transmitter could be achieved using a single DAC, and without the use of conventional current mirror circuitry.

SUMMARY OF THE INVENTION

Disclosed herein is a line driver that works as the output stage of a wire-line transmitter and provides an accurate replica output used for the local echo cancellation in full duplex wire-line transceiver system. The line driver reduces the matching between transmit (TX) and echo cancellation (EC) paths to only two NMOS transistors to achieve good echo cancellation linearity and robust long distance full duplex operation of wire-line system. Compared to conventional current mirror designs, the active current mirror of the line driver can achieve better matching both at low frequency and over broad signal bandwidths.

Accordingly, a full-duplex wire-line transceiver is provided with echo cancellation line driver. The transceiver has an impedance matching network with a network interface, and a transmit interface to accept a differential transmit signal for transmission via the network, where the differential transmit signal comprises a first transmit signal and a first differential transmit signal opposite in phase to the first transmit signal. The impedance matching network has a receive interface to supply a differential receive signal accepted at the network interface, where the transmit interface is coupled to the receive interface. A hybrid circuit has an input to accept the differential receive signal combined with a coupled differential transmit signal, and input to accept a differential echo cancellation (EC) signal comprising a first EC signal and first differential EC signal opposite in phase to the first EC signal. The hybrid circuit has an output to supply the differential receive signal with the coupled differential transmit signal attenuated in response to the differential EC signal.

A line driver includes a first operational amplifier (OPA) having an input to accept a first input signal and an output to supply a first output voltage, an output to supply the first transmit signal, and an output to supply the first EC signal, where the first transmit signal and first EC signal are both responsive to the first output voltage. The line driver also includes a second OPA having an input to accept a first differential input signal opposite in phase to the first input signal, and an output to supply a second output voltage. The line driver has an output to supply the first differential transmit signal, and an output to supply the first differential EC signal, where the first differential transmit signal and first differential EC signal are both responsive to the second output voltage, and opposite in phase, respectively, to the first transmit signal and first EC signal.

Typically, the line driver also includes a digital-to-analog (DAC) converter having an input to accept a digital signal, an input to accept a clock synchronized to the digital signal, an output to supply the first input signal, and an output to supply the first differential input signal.

Additional details of the above-described transceiver are provided below.

DETAILED DESCRIPTION

Figure 1:
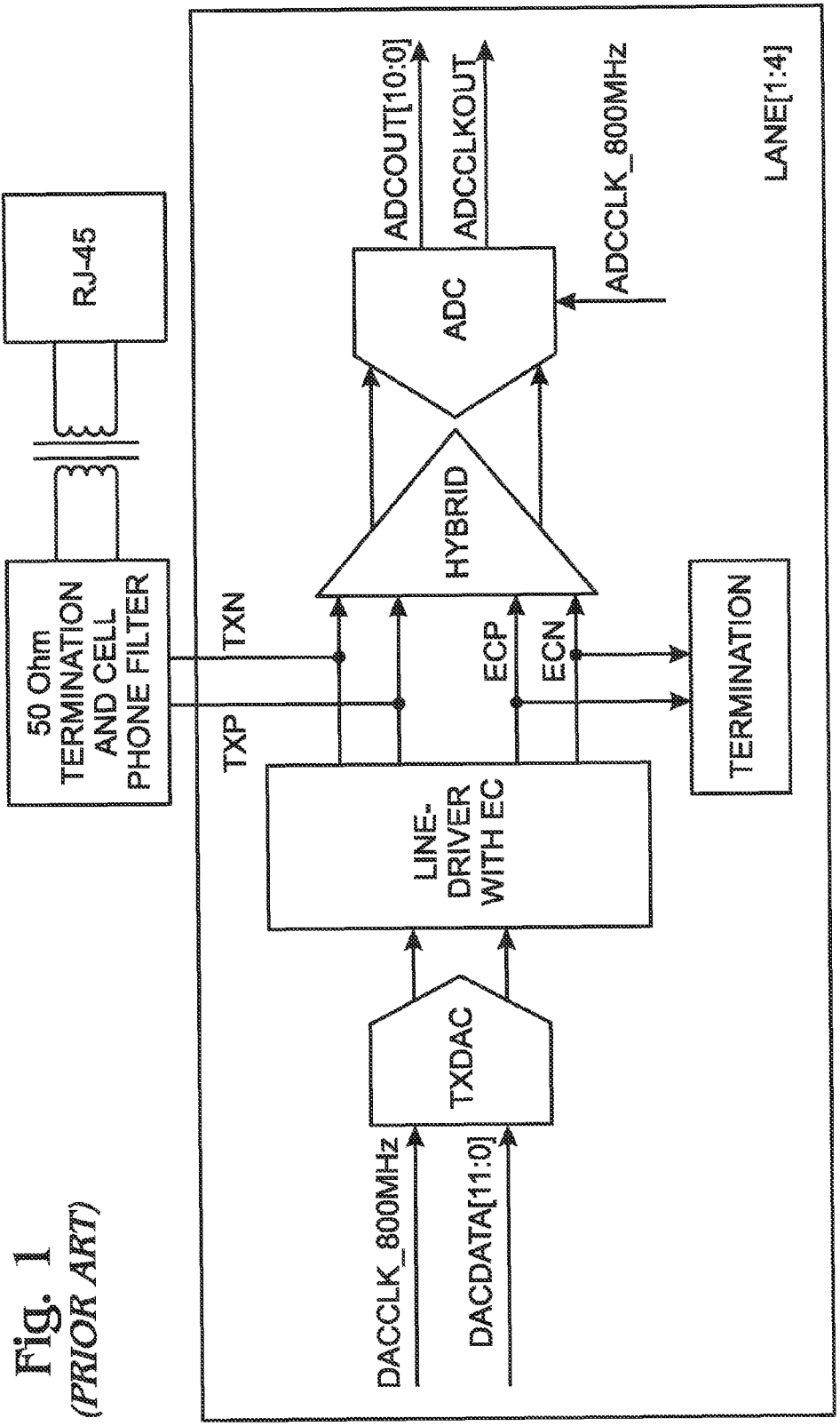
FIG. 1 is a schematic block diagram of an inverted line driver as used in a full duplex wire-line transceiver system (prior art).
Figure 2:
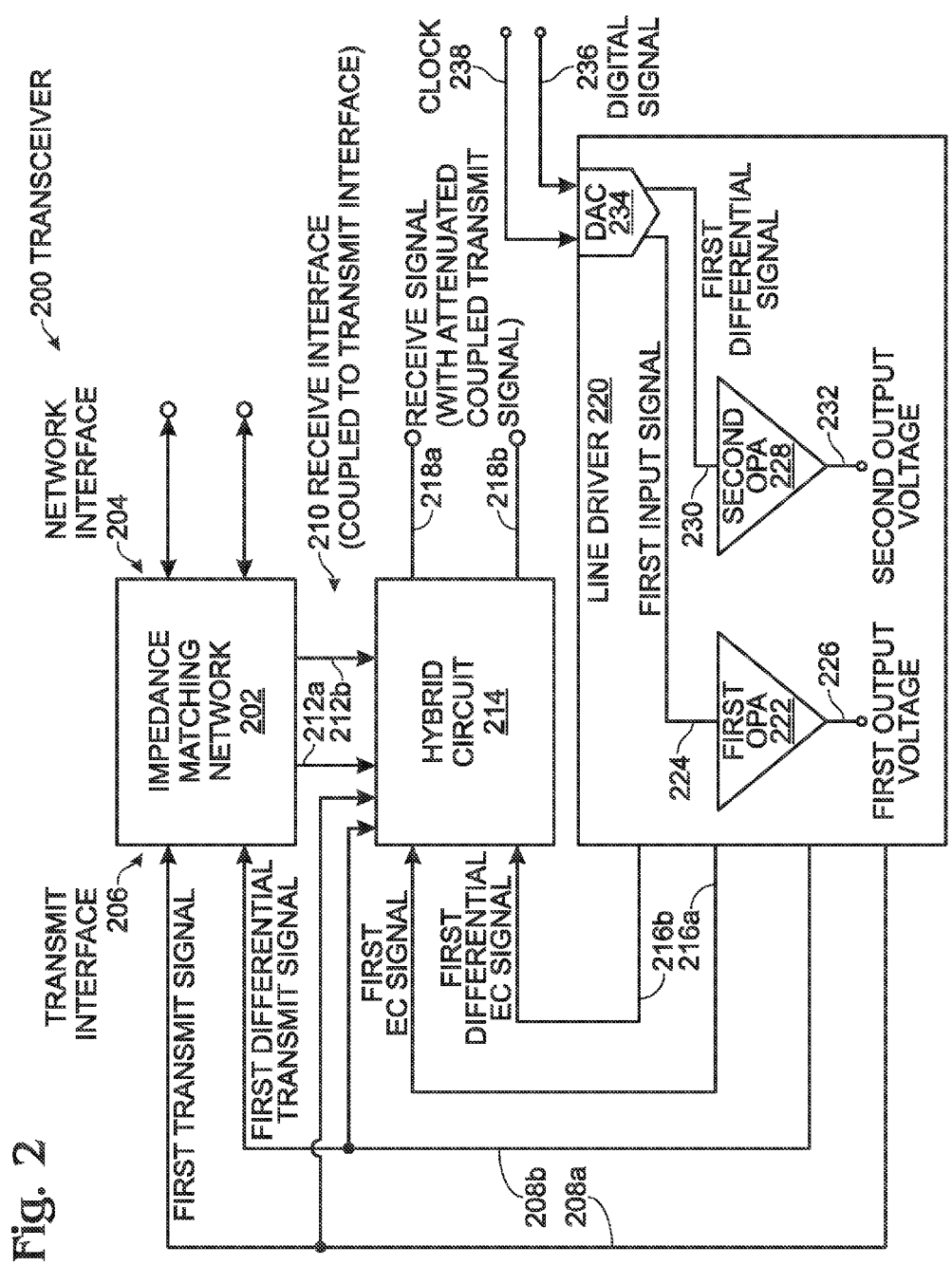
FIG. 2 is a schematic block diagram of a full-duplex wire-line transceiver with echo cancellation line driver.

FIG. 2 is a schematic block diagram of a full-duplex wire-line transceiver with echo cancellation line driver. The transceiver 200 comprises an impedance matching network 202 having a network interface 204 and a transmit interface 206 to accept a differential transmit signal for transmission via the network, where the differential transmit signal comprises a first transmit signal 208a and a first differential transmit signal 208b opposite in phase to the first transmit signal 208a. The impedance matching network 202 has a receive interface 210 to supply a differential receive signal 21a and 212b accepted at the network interface, where the transmit interface is coupled to the receive interface.

A hybrid circuit 214 has an input to accept the differential receive signal 212a and 212b combined with a coupled differential transmit signal, and input to accept a differential echo cancellation (EC) signal comprising a first EC signal 216a and first differential EC signal 216b opposite in phase to the first EC signal 216a. The hybrid circuit 214 also has an input to accept the first transmit signal 208a and the first differential transmit signal 208b. The hybrid circuit 214 has an output to supply the differential receive signal with the coupled differential transmit signal attenuated in response to the differential EC signal. This differential signal is supplied on lines 218a and 218b.

A line driver 220 comprises a first operational amplifier 222 (OPA) having an input on line 224 to accept a first input signal and an output on line 226 to supply a first output voltage. The line driver 220 has an output to supply the first transmit signal on line 208a and an output to supply the first EC signal on line 216a. The first transmit signal on line 208a and first EC signal on line 216a are both responsive to the first output voltage on line 226.

The line driver 220 further comprises a second OPA 228 having an input to accept a first differential input signal on line 230 opposite in phase to the first input signal on line 224, and an output to supply a second output voltage on line 232. The line driver 220 has an output on line 208b to supply the first differential transmit signal and an output on line 216b to supply the first differential EC signal, where the first differential transmit signal on line 208b and the first differential EC signal on line 216b are both responsive to the second output voltage on line 232, and opposite in phase, respectively, to the first transmit signal on line 208a and first EC signal on line 216a.

In one aspect the line driver 220 further comprises a digital-to-analog converter 234 (DAC) having an input on line 236 to accept a digital signal, an input on line 238 to accept a clock synchronized to the digital signal, an output to supply the first input signal on line 224, and an output on line 230 to supply the first differential input signal. For example, the DAC 234 may accept an Ethernet digital signal on line 236.

Figure 3:
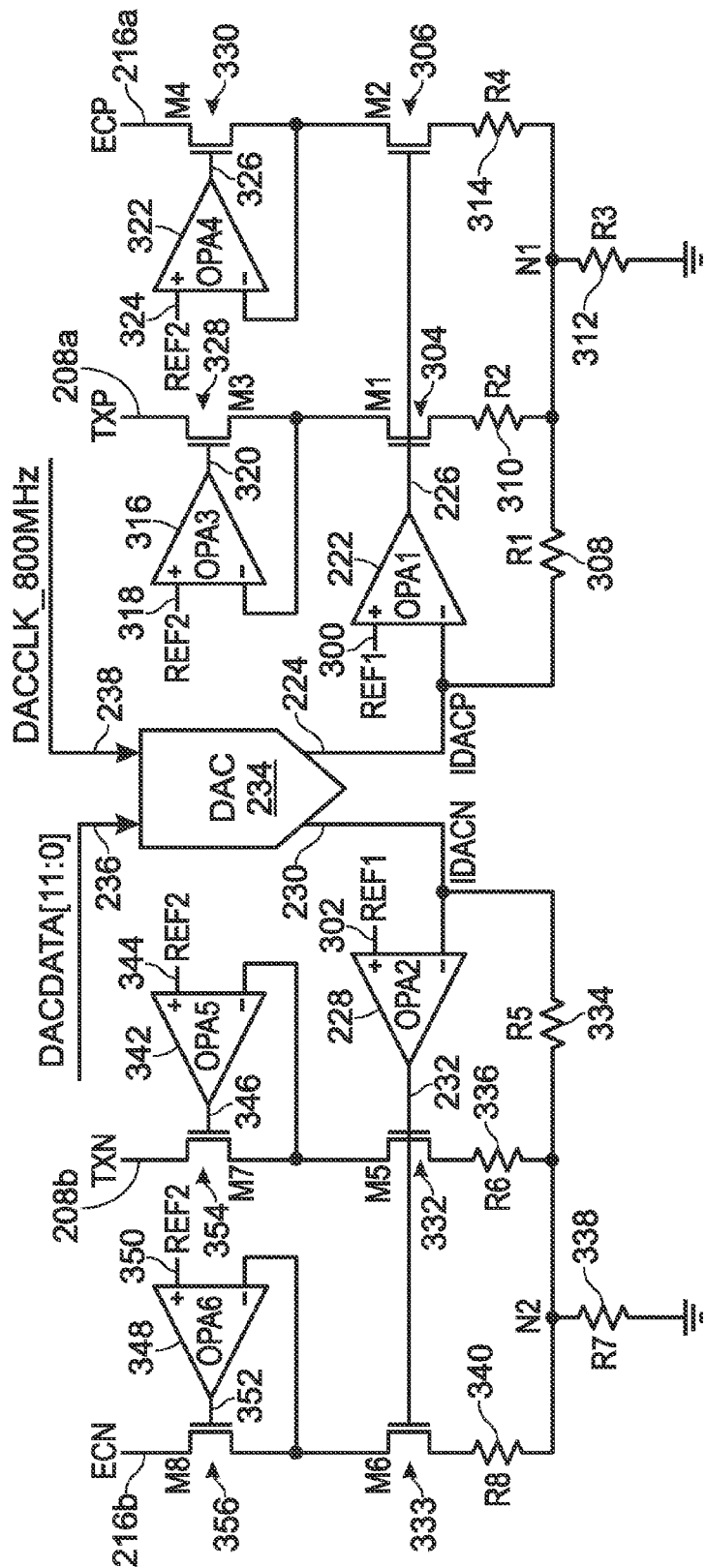
FIG. 3 is a schematic depicting the line driver of FIG. 2 in greater detail.

FIG. 3 is a schematic depicting the line driver of FIG. 2 in greater detail. The line driver first OPA 222 has an input on line 300 to accept a first reference voltage, and the second OPA 228 has an input on line 302 to accept the first reference voltage. The line driver 220 further comprises a first metal-oxide-semiconductor (MOS) transistor 304 (M1) having a gate to accept the first output voltage on line 226, a first source/drain (S/D), and a second S/D. A second MOS transistor 306 (M2) has a gate to accept the first output voltage on line 226, a first S/D, and a second S/D.

A first resistor 308 (R1) has a first end connected to receive the first input signal on line 224, and a second end at node N1. A second resistor 310 (R2) has a first end connected to the second end of the first resistor 308, and a second end connected to the second S/D of the first MOS transistor 304. A third resistor 312 (R3) has a first end connected to the second end of the first resistor 308, and a second end connected to ground (or a dc reference voltage). A fourth resistor 314 (R4) has a first end connected to the second end of the first resistor 308, and a second end connected to the second S/D of the second MOS transistor 306.

A third OPA 316 has an input connected to the first S/D of the first MOS transistor 304, an input to accept a second reference voltage on line 318, and an output on line 320. A fourth OPA 322 has an input connected to the first S/D of the second MOS transistor 306, an input to accept the second reference voltage on line 324, and an output on line 326. A third MOS transistor 328 has a gate connected to the output of the third OPA on line 320, a first S/D to supply the first transmit signal on line 208a, and a second S/D connected to the first S/D of the first MOS transistor 304. A fourth MOS transistor 330 has a gate connected to the output of the fourth OPA on line 326, a first S/D to supply the first EC signal on line 216a, and a second S/D connected to the first S/D of the second MOS transistor 306.

A fifth MOS transistor 332 has a gate to accept the second output voltage, a first S/D, and a second S/D. A sixth MOS transistor 333 has a gate to accept the second output voltage on line 232, a first S/D, and a second S/D. A fifth resistor 334 (R5) has a first end connected to receive the first differential input signal on line 230, and a second end connected to node N2. A sixth resistor 336 (R6) has a first end connected to the second end of the fifth resistor 334, and a second end connected to the second S/D of the fifth MOS transistor 332. A seventh resistor 338 (R7) has a first end connected to the second end of the fifth resistor 334, and a second end connected to ground. An eighth resistor 340 (R8) has a first end connected to the second end of the fifth resistor 334, and a second end connected to the second S/D of the sixth MOS transistor 333.

A fifth OPA 342 has an input connected to the first S/D of the fifth MOS transistor 332, an input to accept the second reference voltage on line 344, and an output on line 346. A sixth OPA 348 has an input connected to the first S/D of the sixth MOS transistor 333, an input to accept the second reference voltage on line 350, and an output on line 352. A seventh MOS transistor 354 has a gate connected to the output of the fifth OPA on line 346, a first S/D to supply the first differential transmit signal on line 208b, and a second S/D connected to the first S/D of the fifth MOS transistor 332. An eighth MOS transistor 356 has a gate connected to the output of the sixth OPA on line 352, a first S/D to supply the first differential EC signal on line 216b, and a second S/D connected to the first S/D of the sixth MOS transistor 333. In one aspect the first, second, third, fourth, fifth, sixth, seventh, and eighth MOS transistors are NMOS transistors.

Figure 4:
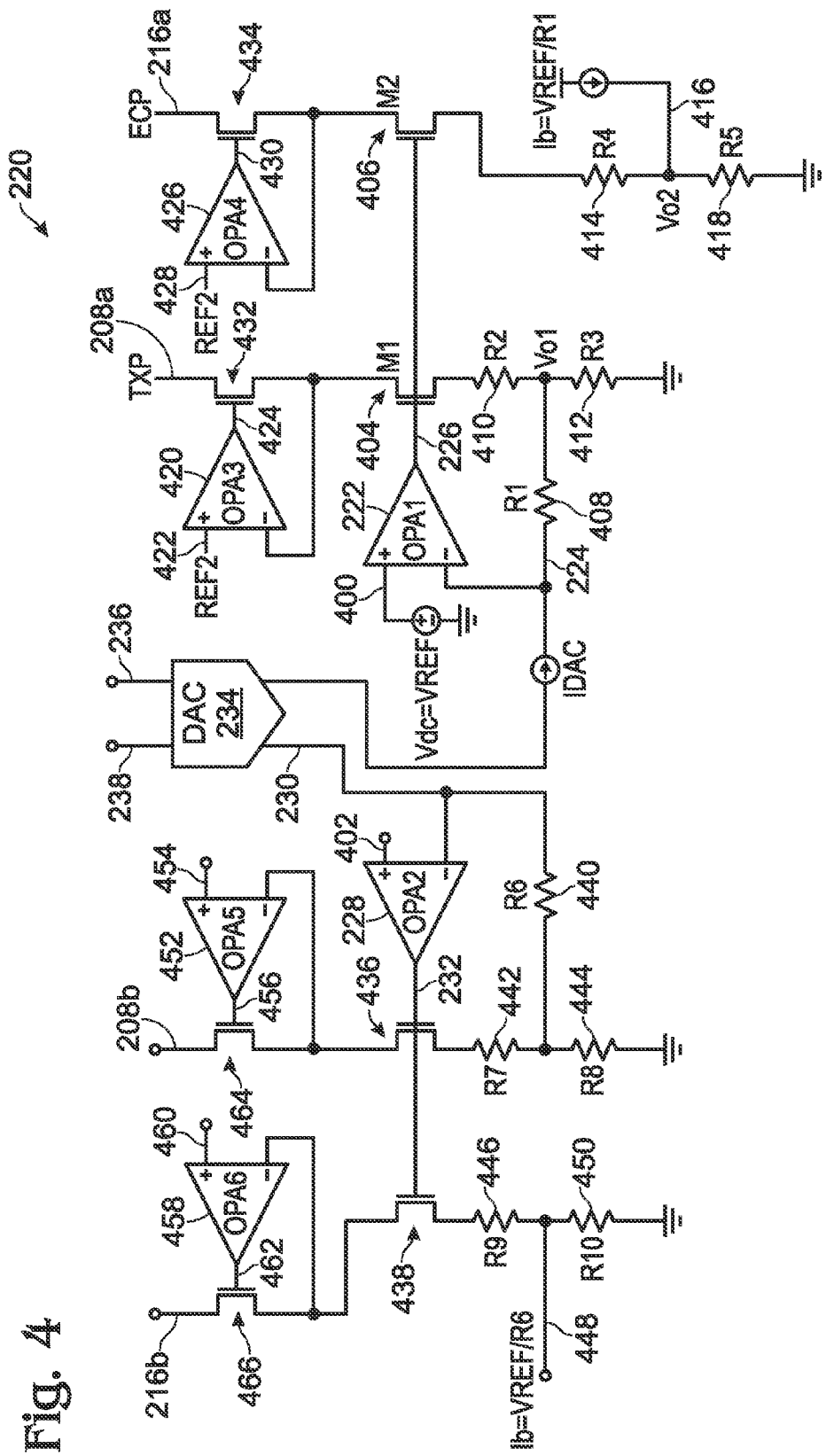
FIG. 4 is a schematic depicting a variation of the line driver of FIG. 2.

FIG. 4 is a schematic depicting a variation of the line driver of FIG. 2. The line driver first OPA 222 has an input on line 400 to accept a first reference voltage, and the second OPA 228 has an input to accept the first reference voltage on line 402. The line driver 222 further comprises a first MOS transistor 404 (M1) having a gate to accept the first output voltage on line 226, a first S/D, and a second S/D. A second MOS transistor 406 (M2) has a gate to accept the first output voltage on line 226, a first S/D, and a second S/D.

A first resistor 408 (R1) has a first end connected to receive the first input signal, and a second end connected to the node associated with voltage Vo1. A second resistor 410 (R2) has a first end connected to the second end of the first resistor 408, and a second end connected to the second S/D of the first MOS transistor 404. A third resistor 412 (R3) has a first end connected to the second end of the first resistor 408, and a second end connected to ground or a dc reference voltage. A fourth resistor 414 (R4) has a first end connected to the second S/D of the second MOS transistor 406, and a second end accepting a first bias voltage (Ib=first reference voltage/R1) on line 416. A fifth resistor 418 (R5) has a first end connected to the second end of the fourth resistor 414, and a second end connected to ground. A third OPA 420 has an input connected to the first S/D of the first MOS transistor 404, an input to accept a second reference voltage on line 422, and an output on line 424. A fourth OPA 226 has an input connected to the first S/D of the second MOS transistor 406, an input to accept the second reference voltage on line 428, and an output on line 430.

A third MOS transistor 432 has a gate connected to the output of the third OPA on line 424, a first S/D to supply the first transmit signal on line 208a, and a second S/D connected to the first S/D of the first MOS transistor 404. A fourth MOS transistor 434 has a gate connected to the output of the fourth OPA on line 430, a first S/D to supply the first EC signal on line 216a, and a second S/D connected to the first S/D of the second MOS transistor 406.

A fifth MOS transistor 436 has a gate to accept the second output voltage on line 232, a first S/D, and a second S/D. A sixth MOS transistor 438 has a gate to accept the second output voltage on line 232, a first S/D, and a second S/D. A sixth resistor 440 (R6) has a first end connected to receive the first differential input signal on line 230, and a second end. A seventh resistor 442 (R7) has a first end connected to the second end of the sixth resistor 440, and a second end connected to the second S/D of the fifth MOS transistor 436. An eighth resistor 444 (R8) has a first end connected to the second end of the sixth resistor 440, and a second end connected to ground. A ninth resistor 446 (R9) has a first end connected to the second S/D of the sixth MOS transistor 438, and a second end accepting the first bias voltage on line 448. A tenth resistor 450 (R10) has a first end connected to the second end of the ninth resistor 448, and a second end connected to ground.

A fifth OPA 452 has an input connected to the first S/D of the fifth MOS transistor 436, an input to accept the second reference voltage on line 454, and an output on line 456. A sixth OPA 458 has an input connected to the first S/D of the sixth MOS transistor 438, an input to accept the second reference voltage on line 460, and an output on line 462. A seventh MOS transistor 464 has a gate connected to the output of the fifth OPA on line 456, a first S/D to supply the first differential transmit signal on line 208b, and a second S/D connected to the first S/D of the fifth MOS transistor 436. An eighth MOS transistor 466r has a gate connected to the output of the sixth OPA on line 462, a first S/D to supply the first differential EC signal on line 216b, and a second S/D connected to the first S/D of the sixth MOS transistor 438.

In one aspect, the fifth resistor 418 has a resistance equal to the parallel resistance of the first resistor 408 and second resistor 410. Likewise, the tenth resistor 450 has a resistance equal to the parallel resistance of the sixth resistor 440 and eighth resistor 444. In another aspect, the first, second, third, fourth, fifth, sixth, seventh, and eighth MOS transistors are NMOS transistors.

Figure 5:
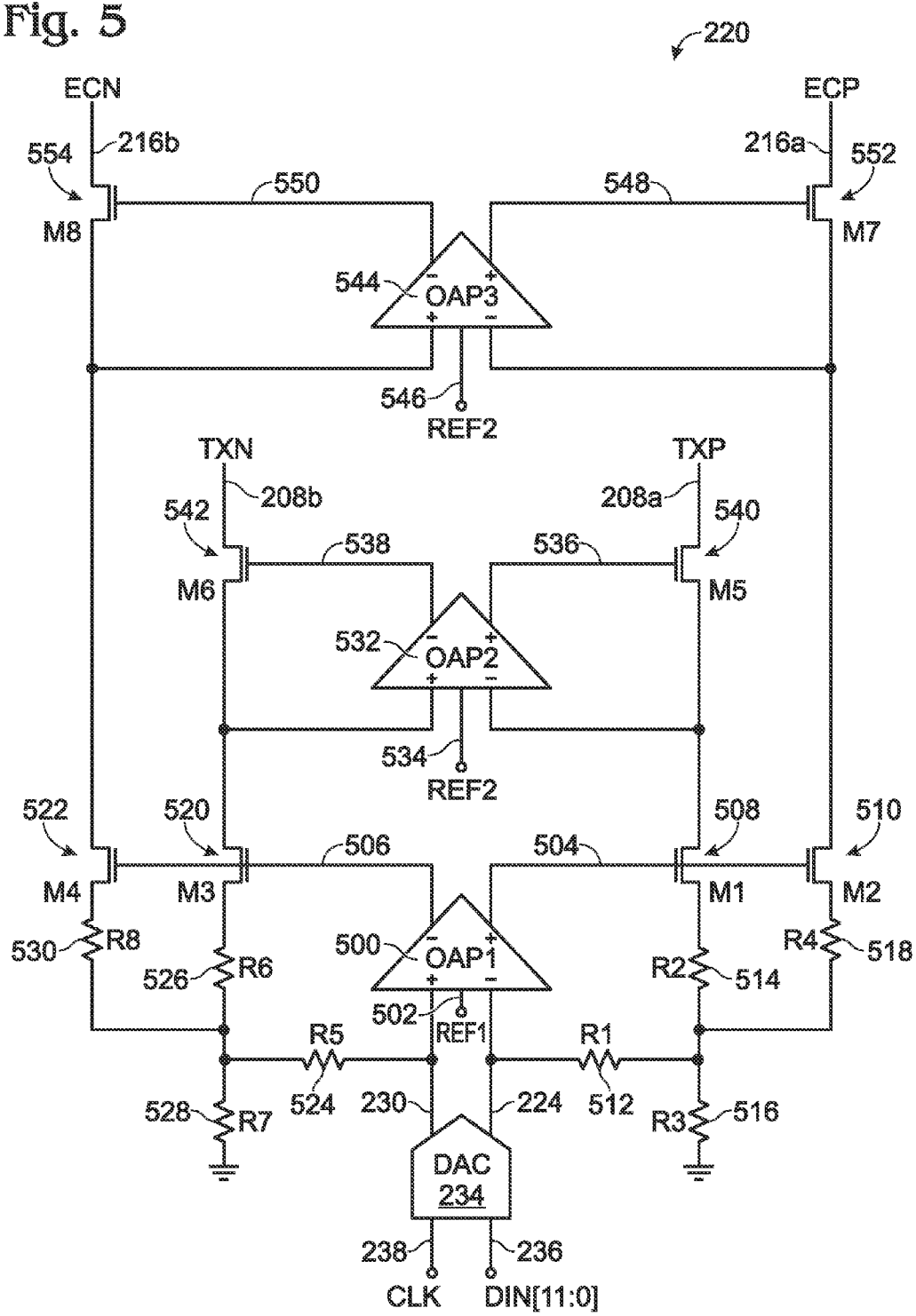
FIG. 5 is a schematic depicting another variation of the line driver of FIG. 2.

FIG. 5 is a schematic depicting another variation of the line driver of FIG. 2. In this aspect, the line driver 220 comprises a first differential OPA 500 having an negative input on line 224 to accept a first input signal, a positive input on line 230 to accept a first differential input signal opposite in phase to the first input signal, a first reference voltage input on line 502, and outputs to supply a first output voltage on line 504 and a first differential output voltage on line 506 opposite in phase to the first output voltage. A first MOS transistor 508 (M1) has a gate to accept the first output voltage on line 504, a first source/drain (S/D), and a second S/D. A second MOS transistor 510 (M2) has a gate to accept the first output voltage on line 504, a first S/D, and a second S/D.

A first resistor 512 (R1) has a first end connected to receive the first input signal on line 224, and a second end. A second resistor 514 (R2) has a first end connected to the second S/D of the first MOS transistor 508, and a second end connected to the second end of the first resistor 512. A third resistor 516 (R3) has a first end connected to the second end of the first resistor 514 and a second end connected to ground or a dc reference voltage. A fourth resistor 518 (R4) has a first end connected to the second S/D of the second MOS transistor 510 and a second end connected to the second end of the first resistor 512.

A third MOS transistor 520 has a gate to accept the first differential output voltage on line 506, a first S/D, and a second S/D. A fourth MOS transistor 522 has a gate to accept the first differential output voltage on line 506, a first S/D, and a second S/D. A fifth resistor 524 (R5) has a first end connected to receive the first differential input signal on line 230, and a second end. A sixth resistor 525 (R6) has a first end connected to the second S/D of the third MOS transistor 520, and a second end connected to the second end of the fifth resistor 524. A seventh resistor 528 (R7) has a first end connected to the second end of the fifth resistor 524 and a second end connected to ground. An eighth resistor 530 (R8) has a first end connected to the second S/D of the fourth MOS transistor 522 and a second end connected to the second end of the fifth resistor 524.

A second differential OPA 532 has a negative input connected to the first S/D of the first MOS transistor 508, a positive input connected to the first S/D of the third MOS transistor 520, a second reference voltage input on line 534, and outputs to supply a second output voltage on line 36 and a second differential output voltage on line 538 opposite in phase to the second output voltage. A fifth MOS transistor 540 has a gate to receive the second output voltage on line 536, a first S/D to supply the first transmit signal on line 208a, and a second S/D connected to the first S/D of the first MOS transistor 508. A sixth MOS transistor 542 has a gate to receive the second differential output voltage on line 538, a first S/D to supply the first differential transmit signal on line 208b, and a second S/D connected to the first S/D of the third MOS transistor 520.

A third differential OPA 544 has a negative input connected to the first S/D of the second MOS transistor 510, a positive input connected to the first S/D of the fourth MOS transistor 522, a second reference voltage input on line 546, and outputs to supply a third output voltage on line 548 and a third differential output voltage on line 550 opposite in phase to the third output voltage.

A seventh MOS transistor 552 has a gate to receive the third output voltage on line 548, a first S/D to supply the EC signal on line 216a, and a second S/D connected to the first S/D of the second MOS transistor 510. An eighth MOS transistor 554 has a gate to receive the third differential output voltage on line 550, a first S/D to supply the first differential EC signal on line 216b, and a second S/D connected to the first S/D of the fourth MOS transistor 522.

Functional Description

As shown in FIG. 3, the differential DAC outputs are connected to the virtual ground nodes of amplifiers OPA1 and OPA2, which converts the DAC signals from current mode to voltage mode at nodes N1 and N2. The output signals go back to the current mode through the two grounded resistors R3 and R7. Two NMOS transistors (M1 and M2) are used to split the output current between the TX (transmitter) path and EC (echo cancellation) path. The top four NMOS cascode transistors (M3-M4 and M7-M8) and four amplifiers OPA3-OPA6 are used to increase the output impedance and reduce the output nonlinearity caused by the high signal swings at the output nodes. One advantage of this line driver is that the circuit design requirement is relaxed in order to achieve the high echo cancellation linearity. Both the current DAC and amplifier OPA1 and OPA2 are at the common signal path between TX path and EC path. The current splitting between M1 and M2 is matched, the nonlinearity caused by the current DAC and amplifiers (OPA1 and OPA2) is cancelled by the local receiver. The source of mismatch between TX and EC path is only $\Delta Vt$ mismatch between M1 and M2, as compared to multiple sources in a conventional multi-DAC approach.

The matching between TX and EC path can be further improved by adding the degenerated resistor R2 and R4 to M1 and M2. Since the resistors' matching in modern CMOS processes is much better than the NMOS transistors, by choosing gm*R much larger than one, the effect of $\Delta Vt$ mismatch between M1 and M2 can be greatly reduced. In order to further improve the performance, either the transistor size of M1 and M2 must be increased, or the resistor values of R2 and R4 increased. Increasing the size of M1 and M2 reduces the bandwidth of OPA1 and OPA2 and increases the power consumption of the line driver. Increasing the resistor values of R2 and R4 reduces the headroom of the line driver. So both methods have their limitations.

As shown in FIG. 4, the degeneration resistor values can be increased without hurting the headroom, by remove the bottom end connection of R1 and R4. Assume that the desire current ratio between TX path and EC path is 1:1, by providing a constant current of VREF/R1 from the power supply, Vo1=Vo2, and equal output currents at TXP and ECP are achieved. This current mirror is based on the perfect math. So ideally the current ratio of 1:1 holds with whatever amplitude or frequency of the input current DAC signal. This is why it is called an active current mirror. It can take a dynamic input current signal and maintain accurate output current matching. Based on this current mirror, the degeneration resistor value of M2 in the EC path is increased and the current matching is improved.

For better power efficiency of the line driver, the 1:1 current ratio between TX path and EC path need not necessarily be maintained. For example, the current in the EC path may be ⅛ of the current in the TX path. By scaling the transistors and resistors in the EC path, ideally a perfect current ratio is still achieved.

A full duplex transceiver with an echo cancelling line driver has been provided. Examples of particular circuit designs have been presented to illustrate the invention. However, the invention is not limited to merely these examples. Other variations and embodiments of the invention will occur to those skilled in the art.

We claim:

1. A full-duplex wire-line transceiver with echo cancellation line driver, the transceiver comprising:
   an impedance matching network having a network interface, and a transmit interface to accept a differential transmit signal for transmission via the network, where the differential transmit signal comprises a first transmit signal and a first differential transmit signal opposite in phase to the first transmit signal, the impedance matching network having a receive interface to supply a differential receive signal accepted at the network interface, where the transmit interface is coupled to the receive interface;
   a hybrid circuit having an input to accept the differential receive signal combined with a coupled differential transmit signal, and input to accept a differential echo cancellation (EC) signal comprising a first EC signal and first differential EC signal opposite in phase to the first EC signal, the hybrid circuit having an output to supply the differential receive signal with the coupled differential transmit signal attenuated in response to the differential EC signal; and,
   a line driver comprising:
      a first operational amplifier (OPA) having an input to accept a first input signal and an output to supply a first output voltage;
      an output to supply the first transmit signal;
      an output to supply the first EC signal, where the first transmit signal and first EC signal are both responsive to the first output voltage;
      a second OPA having an input to accept a first differential input signal opposite in phase to the first input signal, and an output to supply a second output voltage;
      an output to supply the first differential transmit signal;
      an output to supply the first differential EC signal, where the first differential transmit signal and first differential EC signal are both responsive to the second output voltage, and opposite in phase, respectively, to the first transmit signal and first EC signal.

2. The transceiver of claim 1 wherein the line driver further comprises a digital-to-analog converter (DAC) having an input to accept a digital signal, an input to accept a clock synchronized to the digital signal, an output to supply the first input signal, and an output to supply the first differential input signal.

3. The transceiver of claim 2 wherein the line driver first OPA has an input to accept a first reference voltage, and wherein the second OPA has an input to accept the first reference voltage;
   the line driver further comprising:
      a first metal-oxide-semiconductor (MOS) transistor having a gate to accept the first output voltage, a first source/drain (S/D), and a second S/D;
      a second MOS transistor having a gate to accept the first output voltage, a first S/D, and a second S/D;
      a first resistor (R1) having a first end connected to receive the first input signal, and a second end;
      a second resistor (R2) having a first end connected to the second end of the first resistor, and a second end connected to the second S/D of the first MOS transistor;
      a third resistor (R3) having a first end connected to the second end of the first resistor, and a second end connected to ground;
      a fourth resistor (R4) having a first end connected to the second end of the first resistor, and a second end connected to the second S/D of the second MOS transistor;
      a third OPA having an input connected to the first S/D of the first MOS transistor, an input to accept a second reference voltage, and an output;
      a fourth OPA having an input connected to the first S/D of the second MOS transistor, an input to accept the second reference voltage, and an output;
      a third MOS transistor having a gate connected to the output of the third OPA, a first S/D to supply the first transmit signal, and a second S/D connected to the first S/D of the first MOS transistor;

a fourth MOS transistor having a gate connected to the output of the fourth OPA, a first S/D to supply the first EC signal, and a second S/D connected to the first S/D of the second MOS transistor;

a fifth MOS transistor having a gate to accept the second output voltage, a first S/D, and a second S/D;

a sixth MOS transistor having a gate to accept the second output voltage, a first S/D, and a second S/D;

a fifth resistor (R5) having a first end connected to receive the first differential input signal, and a second end;

a sixth resistor (R6) having a first end connected to the second end of the fifth resistor, and a second end connected to the second S/D of the fifth MOS transistor;

a seventh resistor (R7) having a first end connected to the second end of the fifth resistor, and a second end connected to ground;

an eighth resistor (R8) having a first end connected to the second end of the fifth resistor, and a second end connected to the second S/D of the sixth MOS transistor;

a fifth OPA having an input connected to the first S/D of the fifth MOS transistor, an input to accept the second reference voltage, and an output;

a sixth OPA having an input connected to the first S/D of the sixth MOS transistor, an input to accept the second reference voltage, and an output;

a seventh MOS transistor having a gate connected to the output of the fifth OPA, a first S/D to supply the first differential transmit signal, and a second S/D connected to the first S/D of the fifth MOS transistor;

an eighth MOS transistor having a gate connected to the output of the sixth OPA, a first S/D to supply the first differential EC signal, and a second S/D connected to the first S/D of the sixth MOS transistor.

4. The transceiver of claim 3 wherein the first, second, third, fourth, fifth, sixth, seventh, and eighth MOS transistors are NMOS transistors.

5. The transceiver of claim 2 wherein the line driver first OPA has an input to accept a first reference voltage, and wherein the second OPA has an input to accept the first reference voltage;

the line driver further comprising:

a first MOS transistor having a gate to accept the first output voltage, a first S/D, and a second S/D;

a second MOS transistor having a gate to accept the first output voltage, a first S/D, and a second S/D;

a first resistor (R1) having a first end connected to receive the first input signal, and a second end;

a second resistor (R2) having a first end connected to the second end of the first resistor, and a second end connected to the second S/D of the first MOS transistor;

a third resistor (R3) having a first end connected to the second end of the first resistor, and a second end connected to ground;

a fourth resistor (R4) having a first end connected to the second S/D of the second MOS transistor, and a second end accepting a first bias voltage;

a fifth resistor (R5) having a first end connected to the second end of the fourth resistor, and a second end connected to ground;

a third OPA having an input connected to the first S/D of the first MOS transistor, an input to accept a second reference voltage, and an output;

a fourth OPA having an input connected to the first S/D of the second MOS transistor, an input to accept the second reference voltage, and an output;

a third MOS transistor having a gate connected to the output of the third OPA, a first S/D to supply the first transmit signal, and a second S/D connected to the first S/D of the first MOS transistor;

a fourth MOS transistor having a gate connected to the output of the fourth OPA, a first S/D to supply the first EC signal, and a second S/D connected to the first S/D of the second MOS transistor;

a fifth MOS transistor having a gate to accept the second output voltage, a first S/D, and a second S/D;

a sixth MOS transistor having a gate to accept the second output voltage, a first S/D, and a second S/D;

a sixth resistor (R6) having a first end connected to receive the first differential input signal, and a second end;

a seventh resistor (R7) having a first end connected to the second end of the sixth resistor, and a second end connected to the second S/D of the fifth MOS transistor;

an eighth resistor (R8) having a first end connected to the second end of the sixth resistor, and a second end connected to ground;

a ninth resistor (R9) having a first end connected to the second S/D of the sixth MOS transistor, and a second end accepting the first bias voltage;

a tenth resistor (R10) having a first end connected to the second end of the ninth resistor, and a second end connected to ground;

a fifth OPA having an input connected to the first S/D of the fifth MOS transistor, an input to accept the second reference voltage, and an output;

a sixth OPA having an input connected to the first S/D of the sixth MOS transistor, an input to accept the second reference voltage, and an output;

a seventh MOS transistor having a gate connected to the output of the fifth OPA, a first S/D to supply the first differential transmit signal, and a second S/D connected to the first S/D of the fifth MOS transistor;

an eighth MOS transistor having a gate connected to the output of the sixth OPA, a first S/D to supply the first differential EC signal, and a second S/D connected to the first S/D of the sixth MOS transistor.

6. The transceiver of claim 5 wherein the fifth resistor has a resistance equal to the parallel resistance of the first and second resistors; and, wherein the tenth resistor has a resistance equal to the parallel resistance of the sixth and eighth resistors.

7. The transceiver of claim 5 wherein the first, second, third, fourth, fifth, sixth, seventh, and eighth MOS transistors are NMOS transistors.

8. The transceiver of claim 2 wherein the DAC accepts an Ethernet digital signal.

9. A full-duplex wire-line transceiver with echo cancellation line driver, the transceiver comprising:

an impedance matching network having a network interface, a transmit interface to accept a differential transmit signal for transmission via the network, where the transmission signal comprises a first transmit signal and a first differential transmit signal opposite in phase to the first transmit signal, the impedance matching network having a receive interface to supply a differential receive signal accepted at the network interface, where the transmit interface is coupled to the receive interface;

a hybrid circuit having an input to accept the differential receive signal combined with a coupled differential transmit signal, and input to accept an echo cancellation (EC) signal comprising a first EC signal and first differential EC signal opposite in phase to the first EC signal, the hybrid circuit having an output to supply the differential receive signal with the coupled differential transmit signal attenuated in response to the differential EC signal; and, a line driver comprising:

a first differential operational amplifier (OPA) having an negative input to accept a first input signal, a positive input to accept a first differential input signal opposite in phase to the first input signal, a first reference voltage input, and outputs to supply a first output voltage and a first differential output voltage opposite in phase to the first output voltage;

a first metal-oxide-semiconductor (MOS) transistor having a gate to accept the first output voltage, a first source/drain (S/D), and a second S/D;

a second MOS transistor having a gate to accept the first output voltage, a first S/D, and a second S/D;

a first resistor having a first end connected to receive the first input signal, and a second end;

a second resistor having a first end connected to the second S/D of the first MOS transistor, and a second end connected to the second end of the first resistor;

a third resistor having a first end connected to the second end of the first resistor and a second end connected to ground;

a fourth resistor having a first end connected to the second S/D of the second MOS transistor and a second end connected to the second end of the first resistor;

a third MOS transistor having a gate to accept the first differential output voltage, a first S/D, and a second S/D;

a fourth MOS transistor having a gate to accept the first differential output voltage, a first S/D, and a second S/D;

a fifth resistor having a first end connected to receive the first differential input signal, and a second end;

a sixth resistor having a first end connected to the second S/D of the third MOS transistor, and a second end connected to the second end of the fifth resistor;

a seventh resistor having a first end connected to the second end of the fifth resistor and a second end connected to ground;

an eighth resistor having a first end connected to the second S/D of the fourth MOS transistor and a second end connected to the second end of the fifth resistor;

a second differential OPA having a negative input connected to the first S/D of the first MOS transistor, a positive input connected to the first S/D of the third MOS transistor, a second reference voltage input, and outputs to supply a second output voltage and a second differential output voltage opposite in phase to the second output voltage;

a fifth MOS transistor having a gate to receive the second output voltage, a first S/D to supply the first transmit signal, and a second S/D connected to the first S/D of the first MOS transistor;

a sixth MOS transistor having a gate to receive the second differential output voltage, a first S/D to supply the first differential transmit signal, and a second S/D connected to the first S/D of the third MOS transistor;

a third differential OPA having a negative input connected to the first S/D of the second MOS transistor, a positive input connected to the first S/D of the fourth MOS transistor, a second reference voltage input, and outputs to supply a third output voltage and a third differential output voltage opposite in phase to the third output voltage;

a seventh MOS transistor having a gate to receive the third output voltage, a first S/D to supply the EC signal, and a second S/D connected to the first S/D of the second MOS transistor; and, an eighth MOS transistor having a gate to receive the third differential output voltage, a first S/D to supply the first differential EC signal, and a second S/D connected to the first S/D of the fourth MOS transistor.

10. The transceiver of claim 9 wherein the line driver further comprises a digital-to-analog (DAC) converter having an input to accept a digital signal, an input to accept a clock synchronized to the digital signal, an output to supply the first input signal, and an output to supply the first differential input signal.

11. The transceiver of claim 10 wherein the DAC accepts an Ethernet digital signal.

* * * * *